Patented Mar. 31, 1942

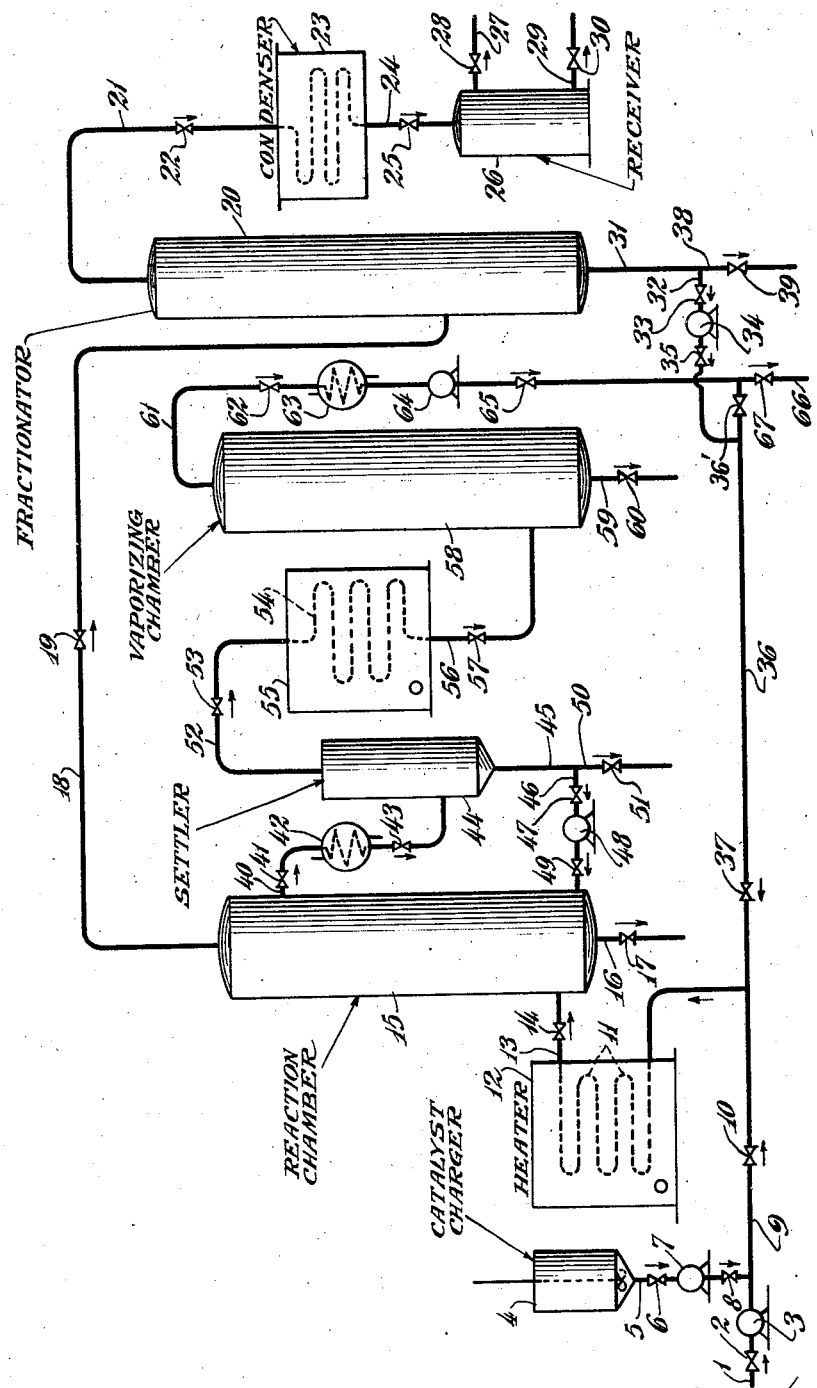

2,278,228

UNITED STATES PATENT OFFICE 2,278,228

HYDROCARBON CONVERSION

Kenneth M. Watson, Chicago, Ill., assignor to Universal Oil Products Company, Chicago, Ill., a corporation of Delaware Application May 13, 1940, Serial No. 334,793

10 Claims. (Cl. 196—52)

This invention relates to a process for converting hydrocarbon oil into substantial yields of high anti-knock gasoline. More particularly it relates to a process for catalytically cracking hydrocarbon oils boiling above the gasoline range in the presence of catalysts suspended in the oil undergoing treatment.

In one specific embodiment the present invention comprises a process for cracking hydrocarbon oil which consists in mixing said hydrocarbon oil with a relatively minor amount of powdered cracking catalyst, heating the mixture to cracking conditions of temperature and pressure, passing it to a reaction zone at a pressure adequate to maintain a major portion of the reactants boiling above the gasoline range in the liquid phase, fractionating the vaporous products into gasoline, gas and recycle oil, said recycle oil being returned for further conversion, removing a portion of the liquid reactants from said reaction zone to a settling zone, returning a settled slurry of catalyst and oil from said settling zone to said reaction zone, removing substantially catalyst-free oil from the upper portion of said settling zone to a vaporizing zone, returning a vaporous fraction for further conversion and withdrawing a residual fraction unsuitable for further conversion containing spent catalyst in suspension.

The invention is further understood by reference to the accompanying drawing which diagrammatically illustrates one embodiment of the process but which should not be interpreted as unduly limiting it to the exact apparatus shown.

The hydrocarbon oil charge is introduced through line 1, valve 2, and pump 3. The charge may comprise any suitable fraction of hydrocarbon oil such as, for example, distillate fractions of petroleum boiling substantially above the gasoline range and including naphtha, kerosene, gas oil, wax distillate, etc. Similar stocks from other hydrocarbon sources may also be converted. Fractions of crude petroleum obtained by solvent extraction and other methods may also be treated according to the present invention. In certain instances, topped crude oil or reduced crude oil may be charged.

A powdered catalyst is introduced from catalyst charger 4 through line 5, valve 6, pump 7 and valve 8, joining with the charging stock in line 9.

The catalytic agent may comprise any suitable cracking catalyst such as, for example, the silica-alumina, silica-zirconia and silica-alumina-zirconia type of catalyst which is prepared by the separate or simultaneous precipitation of the components in powder form followed by washing and drying under such conditions that alkali metal ions are substantially removed. The composites may also comprise minor amounts of promoting compounds such as boron oxide or the oxides or sulfides of molybdenum, chromium, tungsten, vanadium and the like. Another suitable cracking catalyst comprises acid-treated clays or other naturally occurring earths which have been activated by treatment with mineral acids or other chemicals. Still another type of catalytic agent is that prepared by the impregnation of relatively inert supports such as alumina, magnesia, silica, zinc oxide, titania, etc., with compounds and particularly the oxides of elements appearing in the left-hand column of the IV, V and VI groups of the Periodic Table, including chromium, molybdenum, tungsten, vanadium, titanium, zirconium, thorium, etc. This type of catalyst composite may be mixed with or otherwise combined with the types of catalyst previously mentioned. It should be understood that the catalysts described are not necessarily equivalent in their action or in the reactions which they promote under the operating conditions of the present process.

The amount of catalyst used may vary considerably within the limits of approximately 0.1–10% but is preferably within the limits of approximately 0.1–5% by weight of the hydrocarbon oil charged. The catalyst may be mixed with a portion of the charging stock or with some other suitable carrying medium such as a fraction of the reaction products of the process, or may even be introduced as a slurry in relatively minor amounts of water.

The mixture of catalyst and oil passes through line 9 and valve 10 to coil 11 which is disposed in heater 12. The temperature is raised to a point within the range of approximately 500–1200° F., and preferably approximately 600–1000° F. Sufficient pressure is maintained both in the coil and in the reaction chamber following to keep a major portion of the hydrocarbon oil boiling above the gasoline range substantially in liquid phase. This pressure is usually within the range of approximately 50–2000 pounds per square inch. The heated reactants are passed through line 13 and valve 14 to reaction chamber 15. The reactants are introduced beneath the surface of a liquid level maintained in the reaction chamber and although it is not shown may be introduced through a spray or other distributing device. The reaction chamber is provided with a draw-off line 16 containing valve 17. Vaporous reactants comprising largely gasoline and gas are removed through line 18 and valve 19 to fractionator 20. Gasoline and gas are recovered through line 21, valve 22, condenser 23, line 24, valve 25 and receiver 26. The gaseous fraction may be removed through line 27 and valve 28. Although not shown in the drawing, a portion of the gases may be recycled to either the coil or the reaction chamber. The gasoline is removed through line 29 and valve 30 to a suitable stabilizer and such subsequent treatment as may be required. The stabilizer gases may be treated in subsequent polymerization and/or alkylation steps to produce additional yields of high anti-knock motor fuel.

The fraction of oil boiling above the gasoline range may be removed from fractionator 20 through line 31, line 32, valve 33, pump 34, valve 35, line 36 and valve 37 joining with the hydrocarbon oil charge from line 9 and thus being returned to the system for further conversion. A part of the oil may be withdrawn through line 38 and valve 39.

A portion of the liquid reaction products from reaction chamber 15 is removed through line 40, valve 41, cooler 42 and valve 43 to settler 44. This comprises a gravity settler in which a concentrating effect occurs, the catalyst settling to the bottom by reason of its having greater weight than the oil undergoing conversion. The concentrated slurry of catalyst and oil is passed through line 45, line 46, valve 47, pump 48 and valve 49 to reaction chamber 15, thereby building up a concentration of catalyst in the reaction zone without necessitating a correspondingly large concentration of catalyst in the oil being charged. The amount of catalyst maintained in the reaction chamber may vary between 5% and 40% by weight of the oil contained therein. A relatively minor portion of the catalyst concentrate may be withdrawn through line 50 and valve 51 to a suitable separating step not shown wherein the catalyst is separated substantially completely from the oil and may be reactivated by treatment with an oxygen-containing gas, for example, at a temperature within the range of approximately 700–1500° F. The catalyst may then be used again in the process. The amount of catalyst withdrawn corresponds to the amount being charged with the raw oil. A substantially catalyst-free oil may be removed from settler 44 through line 52, valve 53, and coil 54 which is disposed in heater 55, then through line 56 and valve 57 to vaporizing chamber 58. The temperature in coil 54 is increased to a suitable vaporizing temperature. The pressure maintained in vaporizing chamber 58 may be considerably reduced over that maintained in the reaction system. A residual fraction unsuitable for further conversion is removed through line 59 and valve 60. A distillate fraction of vapors is removed through line 61, valve 62, cooler 63, pump 64, valve 65, line 36, valve 36' and valve 37, being thus returned through coil 11 to the reaction zone for further conversion. A portion of the oil may be removed through line 66 and valve 67.

It is also within the scope of the invention to remove other intermediate fractions from the vaporizing chamber which may be suitable for special fuel purposes such as Diesel fuel, tractor fuel, furnace distillate and the like. For purposes of simplifying the drawing, such means are not indicated.

The process may also be operated on a once-through basis wherein no reflux is recycled, although of course the greatest conversion is obtainable when operating with a return of a part or all of the recycle oil.

When operating the process at a temperature of approximately 850° F., and a pressure of 250 pounds per square inch on the reaction chamber and coil and charging 0.25% of silica-alumina cracking catalyst by weight of the oil undergoing conversion, a yield of 76 octane number gasoline having an endpoint of 400° F., amounting to approximately 31% of the original charge may be obtained. When operating with recycle of all fractions boiling substantially within the gas oil range, a yield of approximately 70% of 79 octane number gasoline may be obtained from Pennsylvania gas oil. A catalyst concentration of approximately 30% of the oil may be maintained in the reaction chamber.

I claim as my invention:

1. A process for converting hydrocarbon oil into valuable products including high antiknock gasoline which comprises mixing said oil with a powdered cracking catalyst, heating the mixture to cracking conditions of temperature and pressure, passing the reactants to a reaction zone maintained at a cracking temperature and under a sufficient pressure to maintain a major portion of the reactants boiling above the gasoline range in liquid phase, removing a vaporous fraction from said reaction zone and recovering the gasoline and gas therefrom, removing unvaporized oil containing catalyst in suspension from said reaction zone and subjecting the same to gravity settling whereby the catalyst is concentrated, returning a portion of the concentrate to said reaction zone, withdrawing a portion of the catalyst concentrate, removing a substantially catalyst-free oil from said settling zone, subjecting the last-named oil to vaporization and returning resultant vaporized hydrocarbons for further conversion to gasoline.

2. A process for converting hydrocarbon oil into substantial yields of high antiknock gasoline which comprises adding to said oil a minor amount of powdered cracking catalyst, heating the mixture to catalytic cracking conditions of temperature and pressure, passing the reactants to a reaction zone maintained at a catalytic cracking temperature and under pressure adequate to maintain a major portion of the reactants boiling above the gasoline range in substantially liquid phase, removing a vaporous fraction from said reaction zone, recovering therefrom gas and gasoline, removing unvaporized oil and suspended catalyst from said reaction zone to a settling zone wherein a major portion of the unvaporized oil is freed of suspended catalyst by gravity separation, passing the substantially catalyst-free oil from said settling zone to a vaporizing zone at reduced pressure, returning hydrocarbons vaporized in said vaporizing zone for further catalytic cracking, withdrawing a residual fraction unsuitable for further conversion from said vaporizing zone, withdrawing a portion of the oil containing catalyst in suspension, from said settling zone and isolating the same from the process, and returning the remaining portion thereof to said reaction zone for further use in the process.

3. A process for converting hydrocarbon oil into substantial yields of gasoline and gas which comprises mixing said oil with a minor portion of cracking catalyst powder, heating the mixture to catalytic cracking conditions of temperature and pressure, passing the mixture to a reaction zone maintained at a catalytic cracking temperature and a pressure adequate to keep a major portion of the reactants boiling above the gasoline range substantially in liquid phase, removing a vaporous fraction therefrom, recovering gasoline and gas from said vaporous fraction, removing unvaporized oil containing catalyst in suspension from said reaction zone and subjecting the same to gravity settling to concentrate catalyst in a portion of the unvaporized oil, and returning unvaporized oil containing a high concentration of catalyst to said reaction zone.

4. The process as set forth in claim 1 wherein the conversion is carried out at a temperature within the range of approximately 500–1200° F. and a pressure of approximately 50–2000 pounds per square inch.

5. The process of claim 1 wherein the cracking catalyst is selected from the group consisting of silica-alumina, silica-zirconia, and silica-alumina-zirconia.

6. The process of claim 1 wherein the amount of powdered catalyst added to the hydrocarbon oil is within the range of approximately 0.1–5% by weight.

7. A process for converting hydrocarbon oil into substantial yields of high antiknock gasoline which comprises adding to said oil a powdered cracking catalyst in amount substantially less than that maintained in a subsequent reaction zone as hereinafter described, subjecting the mixture to catalytic cracking conditions of temperature and at a pressure adequate to maintain a substantial portion of oil boiling above the gasoline range in liquid phase in said reaction zone, removing the vaporous fraction and recovering gasoline and gas therefrom, withdrawing a portion of liquid reactants from said reaction zone to a separating zone, subjecting the portion to gravity settling whereby the catalyst is substantially removed from a part of the reactants, recovering the upper catalyst-free portion, returning a portion of the remaining oil from said settling zone containing a high concentration of catalyst in suspension to said reaction zone to build up and maintain a higher concentration of catalyst in said zone than is added to the aforesaid hydrocarbon oil and continuously withdrawing a portion of oil containing catalyst in suspension from said settling zone.

8. A process for converting hydrocarbon oil into substantial yields of high antiknock gasoline which comprises mixing said hydrocarbon oil with a powdered cracking catalyst in an amount less than that maintained in a subsequent reaction zone, heating the mixture to catalytic cracking conditions of temperature and pressure, passing the mixture to said reaction zone at catalytic cracking conditions of temperature and under pressure adequate to maintain a major portion of reactants boiling above the gasoline range in substantially liquid phase, recovering gasoline and gas from said reaction zone, increasing the concentration of cracking catalyst in said reaction zone by passing catalyst-containing unvaporized oil from said zone to a settling zone wherein the catalyst concentrates by gravity in a portion of the unvaporized oil which is recycled to said reaction zone, removing a substantially catalyst-free portion of unvaporized oil from said settling zone to a vaporizing zone at reduced pressure and withdrawing a fraction unsuitable for further conversion from said vaporizing zone and returning a portion of the vaporous products therefrom for further conversion to gasoline.

9. A hydrocarbon oil conversion process which comprises adding a powdered cracking catalyst to the oil, heating the resultant mixture to catalytic cracking temperature in a heating zone and then introducing the same to a reaction zone maintained at catalytic cracking temperature and under sufficient pressure to retain a substantial portion of the oil in liquid phase, removing from the reaction zone unvaporized oil containing catalyst in suspension, introducing the withdrawn catalyst-oil suspension to a settling zone and therein concentrating the catalyst in a portion of the unvaporized oil, separating said portion of the unvaporized oil, in which the catalyst has been concentrated, from the remainder of the unvaporized oil and returning thus separated catalyst concentrate to the reaction zone to increase the concentration of catalyst in the reaction zone.

10. A hydrocarbon oil conversion process which comprises adding a powdered cracking catalyst to the oil, heating the resultant mixture to catalytic cracking temperature in a heating zone and then introducing the same to a reaction zone maintained at catalytic cracking temperature and under sufficient pressure to retain a substantial portion of the oil in liquid phase, removing from the reaction zone unvaporized oil containing catalyst in suspension, introducing the withdrawn catalyst-oil suspension to a settling zone and therein concentrating the catalyst in a portion of the unvaporized oil, separating said portion of the unvaporized oil, in which the catalyst has been concentrated, from the remainder of the unvaporized oil and returning thus separated catalyst concentrate to the reaction zone to increase the concentration of catalyst in the reaction zone, subjecting said remainder of the unvaporized oil to vaporization to separate lighter from heavier fractions thereof, and supplying at least a portion of the lighter fractions to said heating zone.

KENNETH M. WATSON.